United States Patent [19]

Lew et al.

[11] Patent Number: 5,460,053
[45] Date of Patent: * Oct. 24, 1995

[54] ELECTRONIC METHOD FOR MASS FLOW MEASUREMENT

[76] Inventors: Hyok S. Lew; Yon S. Lew; Yon K. Lew, all of 7890 Oak St., Arvada, Colo. 80005

[ * ] Notice: The portion of the term of this patent subsequent to Feb. 9, 2010 has been disclaimed.

[21] Appl. No.: 946,675

[22] Filed: Sep. 18, 1992

[51] Int. Cl.$^6$ .................................................. G01F 1/84
[52] U.S. Cl. .................................................. 73/861.38
[58] Field of Search ........................... 73/861.38, 861.37

[56] References Cited

U.S. PATENT DOCUMENTS 4,895,031  1/1990  Cage ..................................... 73/661.38

Primary Examiner—Richard E. Chilcot, Jr.
Assistant Examiner—Harshad Patel

[57] ABSTRACT

An electronic data processing method for determining mass flow rate of media moving through a conduit under flexural vibration comprises measuring of a first value of the first electrical signal generated by a first motion sensor located at a section of the conduit, which measurement is made at an instant determined by a triggering device activated by a zero value of the second electrical signal generated by a second motion sensor located at another section of the conduit, and measuring of a second value of the first electrical signal at another instant determined by a triggering device activated by a peak value of the second electrical signal; and determining mass flow rate of the media as a function of ratio between the first and second values of the first electrical signal by using an empirically obtained mathematical relationship that includes a term cancelling out an error introduced by a delay between the cueing of the measurement of the first electrical signal by the second electrical signal and the measuring of the first electrical signal.

20 Claims, 3 Drawing Sheets

ELECTRONIC METHOD FOR MASS FLOW MEASUREMENT

FIELD OF THE INVENTION

The present invention relates to an electronic data processing method for determining mass flow rate of media moving through a single or a pair of conduits under flexural vibration, which conduit or conduits provides the flow passage for the media in the mass flowmeter known as the "Coriolis force flowmeter" or "Convective inertia force flowmeter".

BACKGROUND OF THE INVENTION

In contrast to the existing method for measuring mass flow rate of media with the so called "Coriolis force flowmeter" or "Convective inertia force flowmeter", wherein the phase angle difference between two oscillating electrical signals representing the flexural vibration of a single or a pair of conduits at two sections thereof, or other parameters related to the phase angle difference, is measured to determine the mass flow rate, a new method previously invented by one of the inventors of the present invention determines the mass flow rate from a ratio between a first value of a first electrical signal generated by a first motion sensor taken at an instant when a second electrical signal generated by a second motion sensor reaches a zero value, and a second value of the first electrical signal taken at another instant when the second electrical signal reaches a peak value. The present invention teaches an electronic data processing method executing the above-described new methodology for measuring the mass flow rate.

BRIEF SUMMARY OF THE INVENTION

The primary object of the present invention is to provide an electronic method for measuring two values of a first oscillating electrical signal respectively at two different instants when the value of a second oscillating electrical signal having the same frequency as and out of phase from the first oscillating electrical signal reaches a zero value and a peak value.

Another object is to provide an electronic data processing method for determining the mass flow rate of media moving through a single or a pair of conduits under flexural vibration as a function of a ratio of two values of the first oscillating electrical signal defined in the primary object of the present invention.

These and other object of the present invention will become clear as the description thereof progresses.

BRIEF DESCRIPTION OF THE FIGURES

The present invention may be described with a greater clarity and specificity by referring to the following figures.

DESCRIPTION OF PREFERRED EMBODIMENTS

Figure 1:
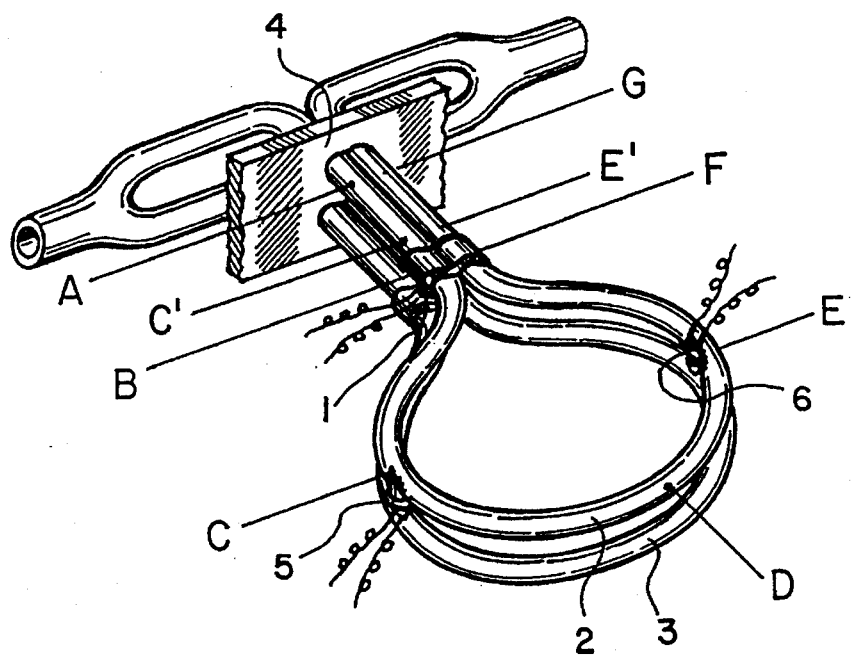
FIG. 1 illustrates a representative embodiment of a pair of vibrating conduits employed in the construction of a mass flowmeter, that represents various embodiments of a single or a pair of conduits under flexural vibration providing a flow passage in the mass flowmeter, and the definition of the coordinate system employed in the mathematical analysis of the dynamics of the flexural vibration of a conduit containing the media moving therethrough, wherein the conduit or conduits is flexurally vibrated in a symmetric mode about the midsection of the conduit.
Figure 2:
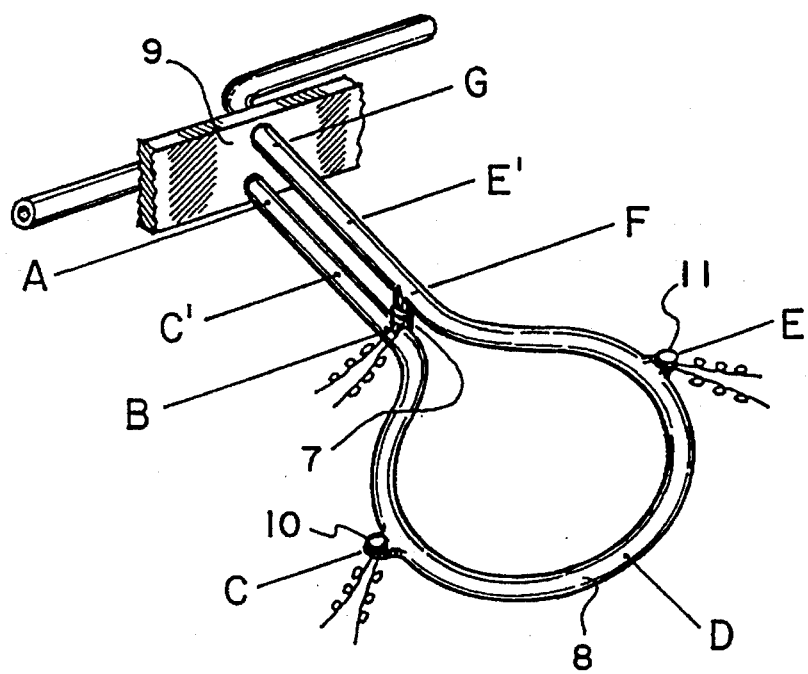
FIG. 2 illustrates a representative embodiment of a single vibrating conduit containing moving media, that represents various embodiments of a single vibrating conduit employed in the construction of the mass flowmeter wherein the single conduit is flexurally vibrated in an antisymmetric mode about the midsection thereof, and the definition of the coordinate system employed in the mathematical analysis of the dynamics of the flexural vibration of the conduit.

FIGS. 1 and 2 illustrate the geometry of the vibrating conduit providing the flow passage in the mass flowmeter, which geometry defines the coordinate system employed in the mathematical formulation of the method for determining the mass flow rate of media moving through the conduit. In the embodiment shown in FIG. 1, a pair of conduits are flexurally vibrated relative to one another by an electromagnetic vibrator 1 with an action element affixed to sections B and F of the first conduit 2 and a reaction element affixed to sections B and F of the second conduit 3, wherein the electromagnetic vibrator 1 generates a relative flexural vibration between the two conduits 2 and 3 in a symmetric mode about the midsection D of the combination of the two conduits. The end sections A and G of the two conduits are fixedly secured to a support structure 4. A pair of motion sensors 5 and 6 disposed symmetrically about the midsection D of the combination of the two conduits 2 and 3 provide two oscillating electrical signals respectively representing the relative flexural vibration between the two conduits 2 and 3 at two sections C and E of the combination of the two conduits. In an alternative structural arrangement of the embodiment shown in FIG. 1, the electromagnetic vibrator 1 may be relocated to the midsection D, or the two motion sensors 5 and 6 may be relocated to sections C' and E'. In the embodiment shown in FIG. 2, an electromagnetic vibrator 7 with an action element affixed to section B and a reaction element affixed to section F vibrates the two opposite halves of the conduit 8 in two opposite directions in an antisymmetric mode about the midsection D of the conduit. The two opposite extremities A and G of the conduit are fixedly secured to a support structure 9. A pair of motion sensors 10 and 11 disposed symmetrically about the midsection D generate two oscillating electrical signals respectively representing the flexural vibration of the conduit 8 at sections C and E. In an alternative structural arrangement of the embodiment shown in FIG. 2, the two motion sensors 10 and 11 may be relocated to sections C' and E'. It should be understood that one of the two motion sensors employed in the embodiment shown in FIG. 1 or 2 may be relocated to the midsection D of the conduit in an alternative design. It should be further understood that the methods for measuring the mass flow rate taught by the present invention is valid for all kinds of conduit geometries as long as two motion sensors provide two electrical signals respectively representing the flexural vibration of the conduit at two different sections of the conduit.

The equation of motion governing the flexural vibration of a conduit with two fixed ends, that contains media moving therethrough, can be written in the form $$EI \frac{\partial^4 y}{\partial x^4} + m \frac{\partial^2 y}{\partial t^2} = F, \quad (1)$$

where E is the modulus of elasticity of the material making up the conduit, I is the moment of inertia of the cross sectional area of the conduit, y is the flexural deflection of the conduit, x is the distance measured from the midsection D following the central axis of the conduit wherein x is negative between the midsection D and the first end section A and positive between the midsection D and the second endsection G of the conduit, m is the mass of the conduit per unit length, t is the time, and F is the resultant force exerted on the inside wall of the conduit by the media contained in the conduit. The deflection y of the conduit must satisfy the following boundary conditions:

$$y = \frac{\partial y}{\partial x} = 0 \text{ at } x = \pm \frac{L}{2}, \quad (2)$$

where L is the length of the conduit. The equation of motion governing the motion of the media contained in the conduit in directions parallel to the direction of the flexural vibration of the conduit can be written in the form $$\rho \frac{\partial^2 y}{\partial t^2} + \rho U \frac{\partial^2 y}{\partial x \partial t} = -\frac{\partial p}{\partial y} + \tau_y, \quad (3)$$

where $\rho$ is the density of the media, U is the convective velocity of the media moving through the conduit, p is the pressure of the media, and $\tau_y$ is the friction within the media acting in directions parallel to the direction of the flexural vibration of the conduit. When the surface integral of the equation (3) taken over the inside wall of the conduit is used to eliminate the resultant force F appearing in the equation (1), the following equation can be obtained:

$$\frac{\partial^4 y}{\partial x^4} + \frac{m + \rho S}{EI} \frac{\partial^2 y}{\partial t^2} = -\frac{\dot{M}}{EI} \frac{\partial^2 y}{\partial x \partial t}, \quad (4)$$

where S is the cross sectional area of the flow passage provided by the conduit and $\dot{M}$ is the mass flow rate of the media moving through the conduit, that is equal to $\rho US$.

The general solution of the equation (4) can be obtained in the form of a series $$y = y_0 + \left(\frac{\dot{M}}{EI}\right) y_1 + \left(\frac{\dot{M}}{EI}\right)^2 y_2 + \ldots, \quad (5)$$

where $y_0$ is the primary flexural vibration of the conduit generated by the electromagnetic vibrator. The solution $y_0$ representing the primary flexural vibration of the conduit satisfies the following homogeneous form of the equation (4):

$$\frac{\partial^4 y_0}{\partial x^4} + \frac{m + \rho S}{EI} \frac{\partial^2 y_0}{\partial t^2} = 0, \quad (6)$$

The secondary solution $y_1$, the tertiary solution $y_2$, etc. represents the flexural vibration of the conduit of the order of magnitude equal to $(\dot{M}/EI)$, $(\dot{M}/EI)^2$, etc. created by the dynamic interactions between the primary flexural vibration of the conduit $y_0$ and the convective motion of the media moving through the conduit with velocity U. The secondary solution $y_1$ satisfies the following particular form of the equation (4);

$$\frac{\partial^4 y_1}{\partial x^4} + \frac{m + \rho S}{EI} \frac{\partial^2 y_1}{\partial t^2} = -\frac{\partial^2 y_0}{\partial x \partial t}. \quad (7)$$

Of course, the primary solution $y_0$ and the secondary solution $y_1$ respectively satisfy the boundary conditions given by the equation (2). Generally, the the primary flexural vibration of the conduit is described by the primary solution of the form $$y_0 = Y_0 X_0(x) \sin \omega t, \quad (8)$$

where $y_0$ is a constant and $X_0(x)$ stands for a function of x, wherein $X_0(x)$ is either a symmetric function of x or an antisymmetric function of x in most cases related to the mass flowmeters. The equations (7) and (8) dictate that the secondary solution describing the secondary flexural vibration of the conduit created by the dynamic interaction between the primary flexural vibration of the conduit and the media moving through the conduit must be of the form $$y_1 = Y_0 X_1(x) \cos \omega t, \quad (9)$$

where $X_1(x)$ stands for a function of x, that is an antisymmetric function of x when $X_0(x)$ is a symmetric function of x and a symmetric function of x when $X_0(x)$ is an antisymmetric function of x. Substitution of the equation (8) and equation (9) into the equation (7) yields the following ordinary linear differential equation for $X_1(x)$:

$$\frac{d^4 X_1(x)}{dx^4} - \frac{m + \rho S}{EI} \omega^2 X_1(x) = -\omega \frac{dX_0(x)}{dx}. \quad (10)$$

When the equation (10) is solved for $X_1(x)$, which solution $X_1(x)$ will not be derived in the present analysis as the method for determining the mass flow rate taught by the present invention can be defined and described without using the explicit mathematical expression for $X_1(x)$, and substituted into the equation (5), the following equation can be obtained after omitting terms of smaller magnitude equal to or less than the tertiary solution $y_2$:

$$y = Y_0 \left[ X_0(x) \sin \omega t + \frac{\dot{M}}{EI} X_1(x) \cos \omega t \right]. \quad (11)$$

Of course, $X_0(x)$ and $X_1(x)$ respectively satisfy the boundary conditions defined by the equation (2), i.e., $$X_0(x) = \frac{dX_0(x)}{dx} = X_1(x) = \frac{dX_1(x)}{dx} = 0 \text{ at} \quad (12)$$

-continued $$x = \pm \frac{L}{2}.$$

The velocity of the flexural vibration of the conduit is given by the time derivative of the equation (11)

$$v(x,t) = \omega Y_0 \left[ X_0(x)\cos\omega t - \frac{\dot{M}}{EI} X_1(x)\sin\omega t \right]. \quad (13)$$

A motion sensor located at a section of the conduit of distance x from the midsection of the conduit generates an oscillating electrical signal equal to $$E(x,t) = \lambda_x \omega Y_0 \left[ X_0(x)\cos\omega t - \frac{\dot{M}}{EI} X_1(x)\sin\omega t \right], \quad (14)$$

where $\lambda_x$ is the amplification factor of the motion sensor located at the section of distance x from the midsection of the conduit in converting the flexural vibration of the conduit into the oscillating electrical signal. At an instant $t=t_1$ when the electrical signal generated by the motion sensor located at $x=a$ reaches a zero value, the following relationship exists at that instant:

$$X_0(a)\cos\omega t_1 - \frac{\dot{M}}{EI} X_1(a)\sin\omega t_1 = 0. \quad (15)$$

When the use of the equation (15) is made in describing the electrical signal generated by the motion sensor located at $x=b$ by the equation (14), it can be shown that the electrical signal generated by the motion sensor located at $x=b$ at an instant when the electrical signal generated by the motion sensor located at $x=a$ reaches a zero value, is equal to $$E(b,t_1)|_{E(a,t_1)=0} = \lambda_b \omega Y_0 \frac{\dot{M}}{EI} \left[ \frac{X_1(a)}{X_0(a)} X_0(b) - X_1(b) \right] \sin\omega t_1. \quad (16)$$

At another instant $t_2=t_1+(\pi/2\omega)$, the electrical signal generated by the motion sensor located at $x=a$ reaches a peak value or the time derivative thereof becomes zero, and the electrical signal generated by the motion sensor located at $x=b$ is equal to $$E(b,t_2)|_{E(a,t_2)=PEAK} = \quad (17)$$

$$-\lambda_b \omega Y_0 \left[ X_0(b) + \left( \frac{\dot{M}}{EI} \right)^2 \frac{X_1(a)}{X_0(a)} X_1(b) \right] \sin\omega t_1.$$

In general, the magnitude of the second term in the bracket appearing on the right hand side of the equation 17 is negligibly small and, consequently, it can be neglected without introducing any error of a detrimental magnitude. When the ratio of the equation (16) to the equation (17) is taken and the resulting equation is solved for the mass flow rate $\dot{M}$, the following equation can be obtained:

$$\dot{M} = \left[ \frac{EI}{\frac{X_1(a)}{X_0(a)} - \frac{X_1(b)}{X_0(b)}} \right] \frac{E(b,t_1)|_{E(a,t_1)=0}}{E(b,t_2)|_{E(a,t_2)=PEAK}}. \quad (18)$$

The term in the bracket appearing on the right hand side of the equation (18) is a constant parameter intrinsic to the mechanical structure and property of the conduit, that is independent of the amplitude of the primary flexural vibration of the conduit and the amount of the mass flow rate of media moving through the conduit. Consequently, the equation (18) can be written in the form $$\dot{M} = K \frac{E_1|_{E_2=0}}{E_1|_{E_2=PEAK}}. \quad (19)$$

The equation (19) states that the mass flow rate of media moving through the conduit under flexural vibration is proportional to the ratio of two values of the electrical signal generated by one of the two motion sensors respectively measured at two different instants when the electrical signal generated by the other of the two motion sensors reaches a zero value and a peak value. In actual operation of a mass flowmeter based on principles set forth by the equation (19), the parameter K may be a weak function of the ratio of the two values of the electrical signal appearing on the right hand side of the equation (19). Therefore, the mass flow rate of media moving through the vibrating conduit employed in the mass flowmeter should be determined from the ratio of the two values of one of the two electrical signals respectively taken at two different instants when the other of the two electrical signals reaches a zero value and a peak value by using an empirically obtained mathematical relationship determined by calibrating the mass flowmeter in place of the theoretically derived formula given by the equation (19).

In the actual implementation of the mass flow measurement wherein the mass flow rate is determined as a function of the ratio of the two values of the first electrical signal generated by a first motion sensor, which two values of the first electrical signal are taken respectively at two different instants when the second electrical signal generated by a second motion sensor reaches a zero value and a peak value, a sample and hold device takes the value of the first electrical signal at an instant determined by the triggering activated by a zero-value detector detecting a zero value of the second electrical signal and activating the sample and hold device. Another sample and hold device (or the same sample and hold device taking the value of the first electrical signal at an instant when the second electrical signal reaches a zero value) takes the value of the first electrical signal at an instant determined by the triggering activated by a peak-value detector detecting a peak value of the second electrical signal (or detecting a zero value of the time derivative of the second electrical signal) and activating the sample and hold device. An electronic data processor calculates the ratio of the two values of the first electrical signal measured by the above-described method and determines the numerical value of the mass flow rate as a function of the ratio of the two values of the first electrical signal by using an empirically obtained mathematical relationship therebetween. In general, there arises an error due to a time delay $\delta_1$ between the instant when the second electrical signal reaches a zero value and the instant when the value of the first electrical signal is actually taken and a time delay $\delta_2$ between the instant when the second electrical signal reaches a peak value and the instant when the value of the first electrical signal is actually taken. In other words, the sample and hold devices measure $E_1(t_1+\delta_1)$ instead of $E_1(t_1)$ where $E_2(t_1)=$zero, and $E_1(t_2+\delta_2)$ instead of $E_1(t_2)$ where $E_2(t_2)=$PEAK or $dE_2(t_2)/dt=0$. The equation (14) can be written in the following form:

$$E(x, t + \delta) = E(x,t)\cos\omega\delta + E\left(x, t + \frac{\pi}{2}\right)\sin\omega\delta. \quad (20)$$

When the electrical signals generated respectively by two motion sensors located at two different sections x=a and x=b are designated by $E_1$ and $E_2$, respectively, and two value of one of the two electrical signals taken respectively with a time delay $\delta_1$ from the instant when the other of the two electrical signals reaches a zero value and a time delay $\delta_2$ from the instant when the other of the two electrical signals reaches a peak value are designate by $E_1(\delta_1)$ and $E_1(\delta_2)$, or $E_2(\delta_1)$ and $E_2(\delta_2)$, respectively, the following relationships can be derived from the equation (20):

$$E_1(\delta_1) = E_1|_{E_2=0}\cos\omega_1 + E_1|_{E_2=PEAK}\sin\omega\delta_1, \quad (21)$$

$$E_1(\delta_2) = E_1|_{E_2=PEAK}\cos\omega\delta_2 - E_1|_{E_2=0}\sin\omega\delta_2, \quad (22)$$

$$E_2(\delta_1) = E_2|_{E_1=0}\cos\omega\delta_1 - E_2|_{E_1=PEAK}\sin\omega\delta_1, \quad (23)$$

$$E_2(\delta_2) = E_2|_{E_1=PEAK}\cos\omega\delta_2 + E_2|_{E_1=0}\sin\omega\delta_2. \quad (24)$$

When the difference between the ratio of the equation (21) to (22) and the ratio of the equation (23) to (24) is taken and the resulting equation is simplified by omitting terms of magnitude equal to or smaller than $\tan^2\delta_2$, the following equation is obtained:

$$\frac{E_1(\delta_1)}{E_1(\delta_2)} - \frac{E_2(\delta_1)}{E_2(\delta_2)} = \left[\frac{E_1|_{E_2=0}}{E_1|_{E_2=PEAK}} - \frac{E_2|_{E_1=0}}{E_2|_{E_1=PEAK}}\right]\frac{\cos\omega\delta_1}{\cos\omega\delta_2}. \quad (25)$$

It can be readily realized by observing the equation (18) that the two terms in the bracket appearing on the right hand side of the equation (25) have the same magnitude and opposite signs. When the use of this fact and the relationship provided by the equation (19) is made, the equation (25) can be written in the form $$\dot{M} = \frac{K}{2}\left[\frac{E_1(\delta_1)}{E_1(\delta_2)} - \frac{E_2(\delta_1)}{E_2(\delta_2)}\right]\frac{\cos\omega\delta_2}{\cos\omega\delta_1} \quad (26)$$

The equation (26) is a theoretically derived formula. In the real world, few physical phenomena exactly agree with the theoretically derived equation. In the actual practice of the method for measuring the mass flow rate based on the principles taught by the equation (26), the mass flow rate must be determined as a function of a linear combination of the ratio of two values of the first electrical signal respectively taken at two instants when the second electrical signal reaches a zero value and a peak value, and the ratio of two values of the second electrical signal respectively taken at two instants when the first electrical signal reaches a zero value and a peak value:

$$\dot{M} = \text{function of}\left[\alpha\frac{E_1(\delta_1)}{E_1(\delta_2)} - \beta\frac{E_2(\delta_1)}{E_2(\delta_2)}\right], \quad (27)$$

where the functional relationship as well as the parameters $\alpha$ and $\beta$ should be determined empirically by calibrating the mass flowmeter. The equation (27) defines the first method of the present invention for measuring the mass flow rate.

The second method for determining the mass flow rate can be established based on the equations (21) and (22), or (23) and (24). Since the actual measurement of the first value of the first electrical signal given by the equation (21) takes place with a delay $\delta_1$ after the second electrical signal reaches a zero value, the error introduced by the time delay $\omega\delta_1$ can be readily eliminated by artificially creating a phase angle delay of $\omega\delta_1$ in the first electrical signal supplied to the first sample and hold device measuring the first value thereof. The error introduced by the delay $\delta_2$ between the actual measurement of the second value of the first electrical signal and the instant when the second electrical signal reaches a peak value can be likewise eliminated by artificially creating a phase angle delay of $\omega\delta_2$ in the first electrical signal supplied to the second sample and hold device measuring the second value thereof. Generally, the two time delays $\delta_1$ and $\delta_2$ have the same numerical value when two identical sample and hold devices respectively triggered by two identical detectors detecting a zero value and a peak are employed. In such a case, a single combination of an inductance element with inductance L and a resistance element with resistance R included in the electric circuit transmitting the first electrical signal eliminates the error introduced by the time delay $\delta = \delta_1 = \delta_2$, when the artificial phase angle delay is set equal to $\omega\delta$ given by the following equation:

$$\omega\delta = \tan^{-1}(\omega L/R) \approx \frac{\omega L}{R} \quad (28)$$

As an alternative to the remedy provided by the equation (28), an artificial phase angle lead of $\omega\delta=\tan^{-1}(1/\omega RC)$ may be imposed on the second electrical signal providing the triggering of the measurement of the first electrical signal by incorporating a combination of a capacitance element with capacitance C and a resistance element with resistance R into the electric circuit transmitting the second electrical signal, or an artificial phase angle lead of $(n\pi/2)-\omega\delta=\tan^{-1}(1/\omega RC)$ may be imposed on the first electrical signal, where n is a positive integer number, by incorporating the capacitance-resistance element into the electric circuit transmitting the first electrical signal. It can be readily realized by observing the equation (28) that the phase angle delay provided by the inductance-resistance element and imposed on the first electrical signal cancels out the delay $\delta$ occuring in the measurement of the first electrical signal independent of the frequency of the flexural vibration of the conduit, while the cancellation of the delay $\delta$ by the imposition of the phase angle lead on the second electrical signal or on the first electrical signal, that is provided by the capacitance-resistance element, is dependent on the frequency of the flexural vibration of the conduit. Therefore, the use of the inductance-resistance element in conjunction with the first electrical signal provides a powerful advantage over the use of the capacitance-resistance element.

When the ratio of the equations (21) to (22), or (23) to (24) is taken and the resulting equation is solved for the mass flow rate by using the relationship provided by the equation (19), the following equations can be obtained:

$$M = K\frac{\frac{E_1(\delta_1)}{E_1(\delta_2)} - \frac{\sin\omega\delta_1}{\cos\omega\delta_2}}{\frac{\cos\omega\delta_1}{\cos\omega\delta_2} + \frac{E_1(\delta_1)}{E_1(\delta_2)}\tan\omega\delta_2}, \quad (29)$$

$$M = K\frac{\frac{E_2(\delta_1)}{E_2(\delta_2)} + \frac{\sin\omega\delta_1}{\cos\omega\delta_2}}{\frac{\cos\omega\delta_1}{\cos\omega\delta_2} - \frac{E_2(\delta_1)}{E_2(\delta_2)}\tan\omega\delta_2}, \quad (30)$$

The third method for measuring the mass flow rate is established based on the equations (29) or (30). In this method, an electronic data processor with a memory having stored values of the delay $\delta_1$ and $\delta_2$ executes the algorithm defined by the equation (29) or (30), or an empirical equivalent thereof, and determines the mass flow rate as a function of the ratio of the two measured values of one of the two electrical signals taken respectively at two instants when the other of the two electrical signals reaches a zero value and a peak value. When the two delay $\delta_1$ and $\delta_2$ have the same numerical value, the mass flow rate may be calculated by using the following approximate form of the equation (29):

$$\dot{M} = K \left[ \frac{E_1(\delta)|_{E_2=0}}{E_1(\delta)|_{E_2=PEAK}} - \tan\omega\delta \right], \quad (31)$$

or by using the following empirically obtained equation:

$$\dot{M} = K \cdot \left[\left[ \frac{E_1(\delta)|_{E_2=0}}{E_1(\delta)|_{E_2=PEAK}} + \right.\right. \quad (32)$$

$$\left.\left. \alpha\tan\left\{ \left[ \beta + \gamma \frac{E_1(\delta)|_{E_2=0}}{E_1(\delta)|_{E_2=PEAK}} \right]\omega\delta \right\} \right]\right],$$

where $\alpha, \beta$ and $\gamma$ are constant parameters determined empirically by calibrating the mass flowmeter.

Figure 3:
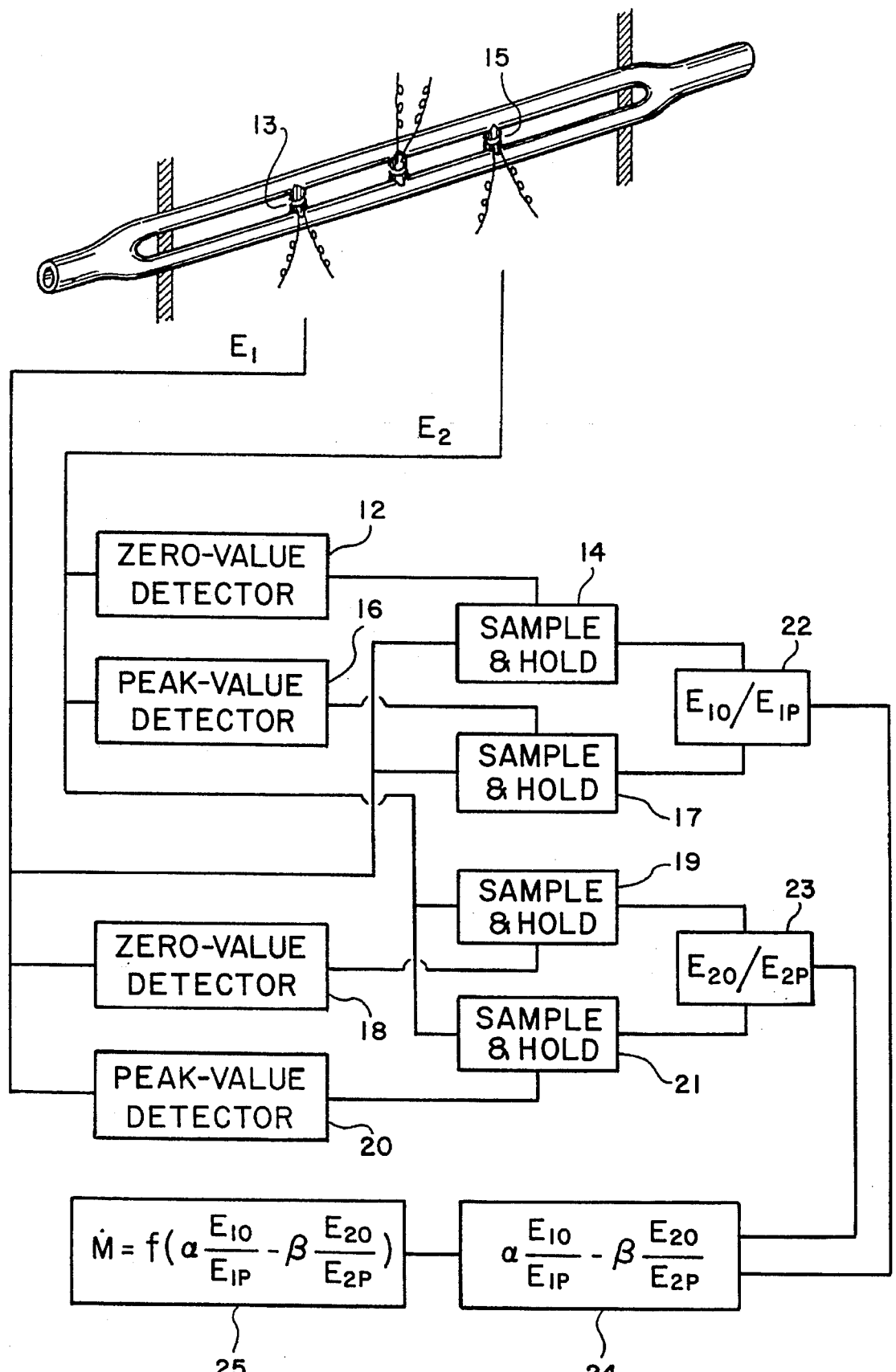
FIG. 3 shows a schematic diagram of an embodiment of the electronic data processor determining the mass flow rate of media moving through a vibrating conduit as a function of a ratio of two values of a first oscillating electrical signal generated by a first motion sensor, which two values of the first oscillating electrical signal are taken respectively at two different instants when the value of a second oscillating electrical signal generated by a second motion sensor reaches a zero value and a peak value.

In FIG. 3, there is illustrated a schematic diagram showing an embodiment of the electronic data processor implementing the first method for measuring the mass flow rate based on the equation (26) or (27). A first zero value detector 12 detects a zero value of the first signal $E_1$ generated by the first motion sensor 13 and activates a first sample/hold device 14 that measure and holds the value of the second electrical signal $E_2$ generated by the second motion sensor 15 at the exact instant when the first electrical signal $E_1$ reaches a zero value or slightly thereafter. A first peak value detector 16 detects a peak value of the first electrical signal $E_1$ and activates a second sample/hold device 17 that measures and holds the value of the second electrical signal $E_2$ at the exact instant when the first electrical signal $E_1$ reaches a peak value or slightly thereafter. A second zero value detector 18 activated by a zero value of the second electrical signal $E_2$ triggers a third sample/hold device 19 that measures and holds the value of the first electrical signal $E_1$ at the exact instant when the second electrical signal $E_2$ reaches a zero value or slightly thereafter. A second peak value detector 20 activated by a peak value of the second electrical signal $E_2$ triggers a fourth sample/hold device 21 that measures and holds the value of the first electrical signal $E_1$ at the exact instant when the second electrical signal $E_2$ reaches a peak value or slightly thereafter. A first dividing device 22 takes the ratio between the two values of the second electrical signal $E_2$ respectively taken at two instants when the first electrical signal $E_1$ reaches a zero value and a peak value, or slightly thereafter, while a second dividing device 23 takes the ratio between the two values of the first electrical signal $E_1$ respectively taken at two instants when the second electrical signal $E_2$ reaches a zero value or a peak value, or slightly thereafter. A summing or subtracting device 24 provides a linear combination of the two ratios of the electrical signals supplied by the two dividing devices 22 and 23, which linear combination is of the combination appearing in the bracket on the right hand side of the equation (27) wherein $\alpha$ and $\beta$ are respectively equal to +1 and −1 under an ideal condition. A computer 25 determines the mass flow rate as a function of the linear combination of the two ratios of the electrical signals supplied by the summing or substracting device 24. The mass flow rate $\dot{M}$ determined by the above-described method is free of error created by the time delay $\delta$ between the instant when the triggering signal reaches a zero value or a peak value and the instant when the value of the measured signal is taken by the sample/hold device triggered by the zero value or the peak value of the triggering signal.

Figure 4:
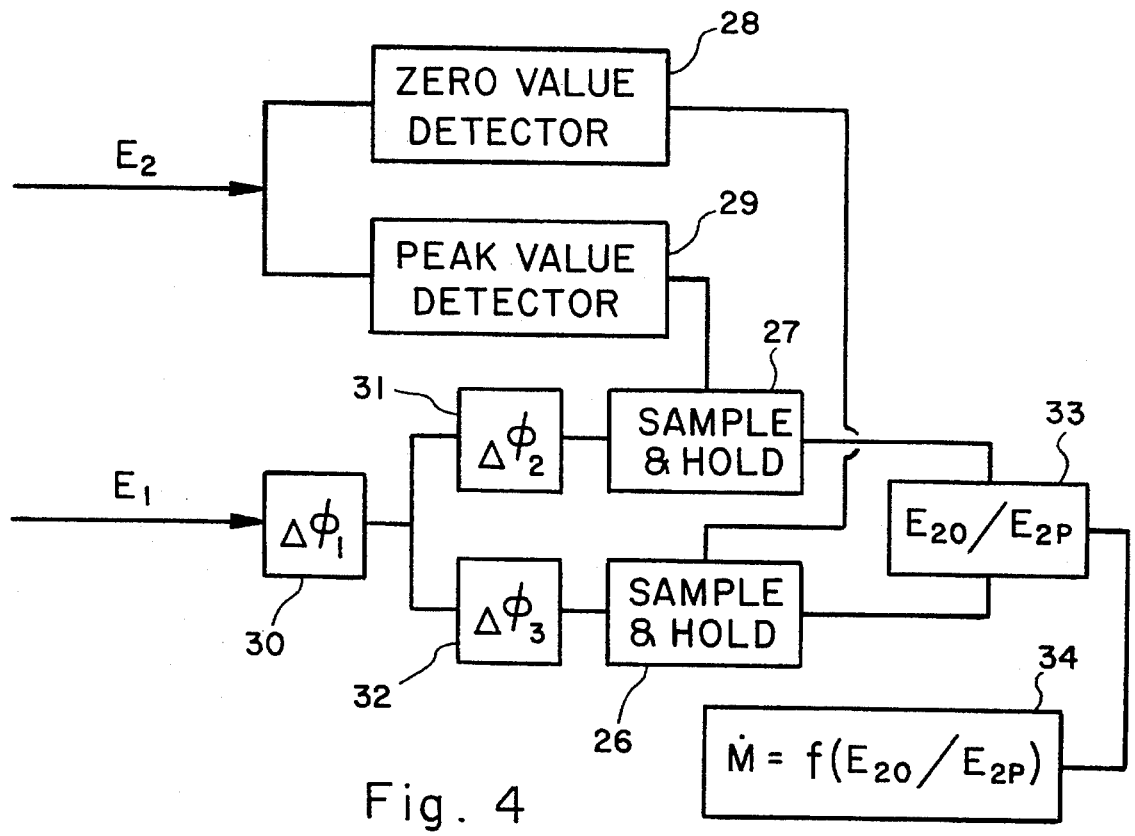
FIG. 4 shows a schematic diagram of another embodiment of the electronic data processor determining the mass flow rate as a function of the ratio of the two values of the first electrical signal taken respectively at two instants when the second electrical signal reaches a zero value and a peak value.

In FIG. 4, there is illustrated a schematic diagram showing an embodiment of the electronic data processor implementing the second method for measuring the mass flow rate based on the equation (28) or other alternative methods described in conjunction therewith. The two values of the first electrical signal $E_1$ are respectively measured and held by the two sample/hold devices 26 and 27, which sample/hold devices are respectively triggered by the zero value detector 28 and the peak value detector 29 respectively detecting a zero value and a peak value of the second electrical signal $E_2$. The first electrical signal $E_1$ is supplied to the two sample/hold devices 26 and 27 through a variable phase angle delay device 30 that imposes a phase angle delay cancelling the delay $\omega\delta$ occurring between the triggering by the zero value detector or the peak value detector and the measuring by the sample/hold device. A further variable phase angle delay devices 31 and/or 32 may be included in conjunction with the two sample/hold devices 26 and 27 in order to fine tune the process of eliminating the error introduced by the delay $\omega\delta$ between the triggering by the zero value detector or the peak value detector and the measuring by the sample/hold device. The most preferred type of the variable phase angle delay device is a series combination of a coil with inductance value L and a variable resistor with resistance value R, that provides a phase angle delay $\tan^{-1}(\omega L/R)$ to one or both branches of the first electrical signal $E_1$ supplied to the two sample/hold devices 26 and 27. In an alternative embodiment, a variable phase angle lead device comprising a series combination of a capacitor with capacitance value C and a variable resistor with resistance value R, that provides a phase angle lead $\tan^{-1}(1/\omega RC)$ cancelling the delay $\omega\delta$ may be included in the electrical circuit supplying the second electrical signal to the zero value and peak value detector. A dividing device 33 takes the ratio of the two values of the first electrical signal $E_1$ respectively taken at the two instants when the second electrical signal $E_2$ reaches a zero value and a peak value or slightly thereafter. A computer 34 determines the mass flow rate as a function of the ratio of the two values of the first electrical signal by using an empirically obtained mathematical relationship therebetween, that is derived by calibrating the mass flowmeter.

Figure 5:
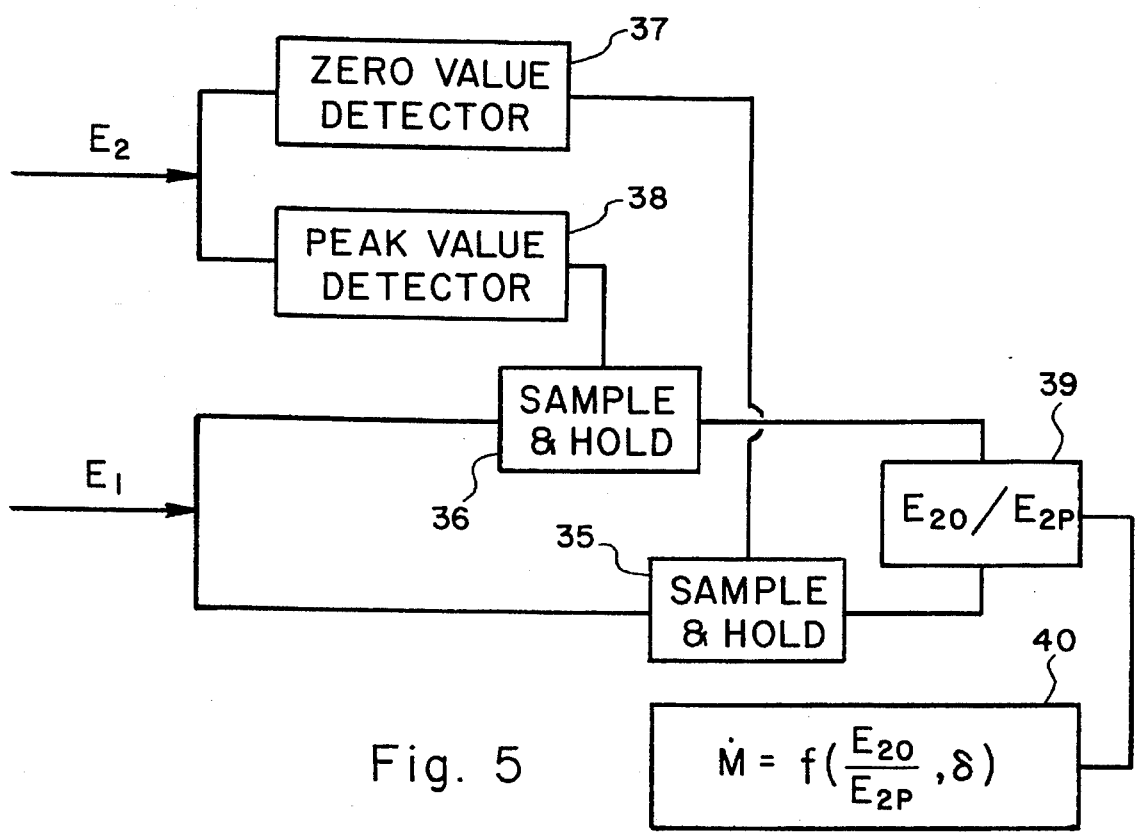
FIG. 5 shows a schematic diagram of a further embodiment of the electronic data processor determining the mass flow rate as a function of the ratio of the two values of the first electrical signal taken respectively at two different instants when the second electrical signal reaches a zero value and a peak value.

In FIG. 5, there is illustrated a schematic diagram showing an embodiment of the electronic data processor implementing the third method for determining the mass flow rate based on the equations (29), (30), (31), (32) or other empirical equivalent thereof. The sample/hold devices 35 and 36 triggered respectively by the zero value detector 37 and the peak value detector 38 of the second electrical signal $E_2$ measure the two values of the first electrical signal $E_1$ respectively at two instants when the second electrical signal $E_2$ reaches a zero value or a peak value, or slightly thereafter. A dividing device 39 takes the ratio of the two values of the first electrical signal $E_1$. The computer 40 determines the mass flow rate as a function of the ratio of the two values of the first electrical signal $E_1$ and predetermined value of of the delay $\delta$ occurring between the triggering of the measurement by the zero value detector or the peak value detector and the measuring by the sample/hold device, which predetermined value obtained by calibrating the mass flowmeter is stored in the memory of the computer 40. In calculating the numerical value of the mass flow rate by an empirically obtained mathematical relationship, the computer 40 uses the stored value of the time delay δ and the frequency of the flexural vibration of the conduit measured by a frequency counter and supplied to the computer 40.

It should be understood that the three methods for measuring the mass flow rate taught by the present invention are universally valid for all types of conduit geometries and all types of modes of the flexural vibrations of the conduits, wherein the two motion sensors are disposed at any two different sections of the conduit, as the derivation of the equations constituting the theoretical basis of the three methods is not limited to any particular geometry of the conduit or any specific mode of the flexural vibration of the conduit, or any special combination of the two motion sensors. However, the best result of the mass flow measurement is obtained when the conduit has a symmetric geometry about the midsection thereof and the conduit is flexurally vibrated in a symmetric or antisymmetric mode about the midsection of the conduit. The most preferred arrangement of the two motion sensors comprises the two motion sensors disposed symmetrically about the midsection of the conduit, or one disposed at the midsection of the conduit and the other disposed at a section away from the midsection. The best result of the measurement of the mass flow rate is obtained when the conduit is flexurally vibrated at a natural frequency thereof. While the principles of the invention have now been made clear by the illustrative embodiments, there will be many modifications of the methods for processing the ratio of the two values of one or both of the two electrical signals, which are immediately obvious to those skilled in the art and particularly adapted to the specific working environments and operating conditions in the practice of the invention without departing from those principles. It is not desired to limit the invention to the particular illustrative embodiments shown and described and, accordingly, all suitable modifications and equivalents may be regarded as falling within the scope of the invention as defined by the claims which follow.

The embodiments of the invention, in which an exclusive property or privilege is claimed, are defined as follows:

1. An electronic data processing method for determining mass flow rate of media moving through at least one conduit with two extremities restrained from experiencing displacement, comprising in combination:

a) generating a primary flexural vibration of said at least one conduit in one of a symmetric and an antisymmetric mode about a center section of the conduit by exerting a vibratory force thereon, said primary flexural vibration of the conduit creating a secondary flexural vibration of the conduit as a result of dynamic interaction between the primary flexural vibration of the conduit and motion of the media moving through the conduit;

b) converting the flexural vibration of the conduit at two different sections of the conduit into a first and second electrical signals respectively generated by a first motion sensor disposed at one of the two different sections of the conduit and a second motion sensor disposed at the other of the two different sections of the conduit;

c) measuring a first value of the first electrical signal at an instant determined by triggering means activated by a zero value of the second electrical signal, and measuring a second value of the first electrical signal at another instant determined by triggering means activated by a peak value of the second electrical signal;

d) measuring a first value of the second electrical signal at an instant determined by triggering means activated by a zero value of the first electrical signal, and measuring a second value of the second electrical signal at another instant determined by triggering means activated by a peak value of the first electrical signal;

e) taking ratio of the first value of the first electrical signal to the second value of the first electrical signal, and ratio of the first value of the second electrical signal to the second value of the second electrical signal; and forming a linear combination of the ratio between the first and second values of the first electrical signal and the ratio between the first and second values of the second electrical signal, wherein an error introduced by a delay between timing by the triggering electrical signal and timing of measuring the measured electrical signal becomes cancelled; and f) determining mass flow rate of the media moving through the conduit as a function of said linear combination of the ratio between the first and second values of the first electrical signal and the ratio between the first and second values of the second electrical signal.

2. A method as defined in claim 1 wherein the first and second motion sensors are disposed in a symmetric relationship with respect to the center section of the conduit.

3. A method as defined in claim 1 wherein the first motion sensor is disposed at the center section of the conduit and the second motion sensor is disposed at a section intermediate the center section and one of two end sections of the conduit.

4. An electronic data processing method for determining mass flow rate of media moving through at least one conduit with two extremities restrained from experiencing displacements, comprising in combination:

a) generating a primary flexural vibration of said at least one conduit in one of a symmetric and an antisymmetric mode about a center section of the conduit by exerting a vibratory force thereon, said primary flexural vibration of the conduit creating a secondary flexural vibration of the conduit as a result of dynamic interaction between the primary flexural vibration of the conduit and motion of the media moving through the conduit;

b) converting the flexural vibration of the conduit at two different sections of the conduit into a first and second electrical signals respectively generated by a first motion sensor disposed at one of the two different sections of the conduit and a second motion sensor disposed at the other of the two different sections of the conduit;

c) artificially imposing a phase angle change on at least one of the first and second electrical signals;

d) measuring a first value of the first electrical signal at an instant determined by triggering means activated by a zero value of the second electrical signal, and measuring a second value of the first electrical signal at another instant determined by triggering means activated by a peak value of the second electrical signal;

e) adjusting value of the artificially imposed phase angle change to a value cancelling at least one of delays between timing by the zero value of the second electrical signal and timing of measuring the first value of the first electrical signal and between timing by the peak value of the second electrical signal and timing of measuring the second value of the first electrical signal;

f) taking ratio of the first value of the first electrical signal to the second value of the first electrical signal; and g) determining mass flow rate of the media moving through the conduit as a function of the ratio between the first and second values of the first electrical signal.

5. A method as defined in claim 4 wherein the first and second motion sensors are disposed in a symmetric relationship with respect to the center section of the conduit.

6. A method as defined in claim 4 wherein the first motion sensor is disposed at the center section of the conduit and the second motion sensor is disposed at a section intermediate the center section and one of two end sections of the conduit.

7. A method as defined in claim 4 wherein the artificially imposed phase angle change is imposed on the first electrical signal.

8. A method as defined in claim 7 wherein the artificially imposed phase angle change imposed on the first electrical signal is provided by a combination of an inductance coil and a variable resistor included in an electric circuit supplying the first electrical signal.

9. An apparatus as defined in claim 8 wherein the first and second motion sensors are disposed in a symmetric relationship with respect to the center section of the conduit.

10. A method as defined in claim 8 wherein the first motion sensor is disposed at the center section of the conduit and the second motion sensor is disposed at a section intermediate the center section and one of two end sections of the conduit.

11. A method as defined in claim 7 wherein the artificially imposed phase angle change comprises a first phase angle change imposed in conjunction with the measuring of the first value of the first electrical signal, and a second phase angle change imposed in conjunction with the measuring of the second value of the first electrical signal; wherein the first phase angle change is set to a value cancelling a delay between timing by the zero value of the second electrical signal and timing of measuring the first value of the first electrical signal, and the second artificial phase angle change is set to a value cancelling a delay between timing by the peak value of the second electrical signal and timing of measuring the second value of the first electrical signal.

12. A method as defined in claim 11 wherein the first phase angle change is provided by a first combination of an inductance coil and a variable resistor included in an electric circuit providing the first value of the first electrical signal, and the second phase angle change is provided by a second combination of an inductance coil and a variable resistor included in an electric circuit providing the second value of the first electrical signal.

13. A method as defined in claim 12 wherein the first and second motion sensors are disposed in a symmetric relationship with respect to the center section of the conduit.

14. A method as defined in claim 12 wherein the first motion sensor is disposed at the center section of the conduit and the second motion sensor is disposed at a section intermediate the center section and one of two end sections of the conduit.

15. A method as defined in claim 4 wherein the artificially imposed phase angle change is imposed on the second electrical signal.

16. A method as defined in claim 15 wherein the phase angle change imposed on the second electrical signal is provided by a combination of a capacitor and a variable resistor included in an electric circuit supplying the second electrical signal.

17. An electronic data processing method for determining mass flow rate of media moving through at least one conduit with two extremities restrained from experiencing displacements, comprising in combination:

a) generating a primary flexural vibration of said at least one conduit in one of a symmetric and an antisymmetric mode about a center section of the conduit by exerting a vibratory force thereon, said primary flexural vibration of the conduit creating a secondary flexural vibration of the conduit as a result of dynamic interaction between the primary flexural vibration of the conduit and motion of the media moving through the conduit;

b) converting the flexural vibration of the conduit at two different sections of the conduit into a first and second electrical signals respectively generated by a first motion sensor disposed at one of the two different sections of the conduit and a second motion sensor disposed at the other of the two different sections of the conduit;

c) measuring a first value of the first electrical signal at an instant determined by triggering means activated by a zero value of the second electrical signal, and measuring a second value of the first electrical signal at another instant determined by triggering means activated by a peak value of the second electrical signal;

d) determining delay between timing by the zero value of the second electrical signal and timing of measuring the first value of the first electrical signal, and delay between timing by the peak value of the second electrical signal and timing of measuring the second value of the first electrical signal; and storing the delays in a memory of an electronic computing device;

e) taking ratio of the first value of the first electrical signal to the second value of the first electrical signals; and f) determining mass flow rate of the media moving through the conduit as a function of the ratio between the first and second values of the first electrical signal, and the delays stored in the memory of the electronic computing device; wherein the electronic computing device executes algorithm defined by the function.

18. A method as defined in claim 17 wherein frequency of the flexural vibration of the conduit is measured and supplied to the electronic computing device; wherein the frequency of the flexural vibration of the conduit is used as a parameter in determining the mass flow rate as a function of the ratio between the first and second values of the first electrical signal and the delays stored in the memory of the electronic computing device.

19. A method as defined in claim 17 wherein the first and second motion sensors are disposed in a symmetric relationship with respect to the center section of the conduit.

20. A method as defined in claim 17 wherein the first motion sensor is disposed at the center section of the conduit and the second motion sensor is disposed at a section intermediate the center section and one of two end sections of the conduit.

* * * * *